(12) United States Patent
Arora et al.

(10) Patent No.: US 10,989,923 B2
(45) Date of Patent: Apr. 27, 2021

(54) ACHROMATIC FREEFORM PRISM FOR NEAR EYE DISPLAYS

(71) Applicant: Futurewei Technologies, Inc., Plano, TX (US)

(72) Inventors: Akash Arora, Normandy Park, WA (US); Mingwei Hsu, Lynwood, WA (US); Gangok Lee, Bothell, WA (US); Zhiqiang Liu, Redmond, WA (US); Angus Wu, Bellevue, WA (US); Wei Zhou, Sammamish, WA (US)

(73) Assignee: Futurewei Technologies, Inc., Plano, TX (US)

( * ) Notice: Subject to any disclaimer, the term of this patent is extended or adjusted under 35 U.S.C. 154(b) by 31 days.

(21) Appl. No.: 16/007,512

(22) Filed: Jun. 13, 2018

(65) Prior Publication Data
US 2019/0384061 A1    Dec. 19, 2019

(51) Int. Cl.
*G02B 27/01*    (2006.01)
*G02C 7/14*    (2006.01)
*G02B 27/42*    (2006.01)

(52) U.S. Cl.
CPC ...... *G02B 27/0172* (2013.01); *G02B 27/4211* (2013.01); *G02B 27/4216* (2013.01); *G02C 7/14* (2013.01); *G02B 2027/011* (2013.01); *G02B 2027/0116* (2013.01); *G02B 2027/0178* (2013.01)

(58) Field of Classification Search
CPC ............. G02B 27/01; G02B 2027/011; G02B 27/0172

USPC ......................................................... 359/630
See application file for complete search history.

(56) References Cited

U.S. PATENT DOCUMENTS

| | | |
|---|---|---|
| 3,992,084 A | 11/1976 | Nakamura |
| 4,669,810 A | 6/1987 | Wood |
| 4,753,522 A | 6/1988 | Nishina et al. |
| 4,863,251 A | 9/1989 | Herloski et al. |
| 5,172,272 A | 12/1992 | Aoki |
| 5,172,275 A | 12/1992 | DeJager |
| 5,526,183 A | 6/1996 | Chen |
| 5,768,024 A * | 6/1998 | Takahashi .......... G02B 27/0172 359/630 |

(Continued)

OTHER PUBLICATIONS

Nikon. "Exit Pupil." Nikon, 2020, imaging.nikon.com/lineup/sportoptics/how_to/guide/binoculars/basic/basic_05.htm (Year: 2020).*

*Primary Examiner* — Zachary W Wilkes
(74) *Attorney, Agent, or Firm* — Conley Rose, P.C.

(57) ABSTRACT

A near eye display includes a main freeform prism lens and a micro-display corrector lens, where the main freeform prism lens includes a first freeform surface, a second freeform surface, and a third freeform surface, the first freeform surface refracting a light from a micro-display into a body of the main freeform prism lens, and the main freeform prism lens having an exit pupil diameter greater than 12 millimeter (mm), and a lateral color aberration of less than 4 micrometer (um)) across a diagonal field of view (FOV), where the micro-display corrector lens is positioned between the main freeform prism lens and the micro-display, the micro-display corrector lens including a first corrector lens surface and a second corrector lens surface, and each surface of the main freeform prism lens and the micro-display corrector lens comprises a surface sag.

18 Claims, 4 Drawing Sheets

(56) References Cited

U.S. PATENT DOCUMENTS

| | | | | |
|---|---|---|---|---|
| 5,880,888 A | * | 3/1999 | Schoenmakers | G02B 17/008 |
| | | | | 359/629 |
| 6,023,373 A | * | 2/2000 | Inoguchi | G02B 27/0172 |
| | | | | 359/631 |
| 6,687,057 B1 | * | 2/2004 | Yamazaki | G02B 27/0172 |
| | | | | 359/630 |
| 9,239,453 B2 | | 1/2016 | Cheng et al. | |
| 9,348,143 B2 | * | 5/2016 | Gao | G02B 27/0172 |

* cited by examiner

ACHROMATIC FREEFORM PRISM FOR NEAR EYE DISPLAYS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A near eye display, also commonly referred to as a head mounted display (HMD), is used to provide virtual, augmented, or mixed-reality experiences to users. In such virtual, augmented, or mixed-reality experiences provided by the near eye display, a computer-generated virtual scene or image is combined with a real-world scene at a user's eyes. Typically, the near eye display is an electronic display that allows the user to see what is shown on the micro display panel while still being able to see the real world. As such, the near eye display maintains a direct-view of the physical world by optically superimposing the computer-generated image of the virtual scene onto the real-world scene.

SUMMARY

In an embodiment, a near eye display includes a main freeform prism lens and a micro-display corrector lens. The main freeform prism lens includes a first freeform surface, a second freeform surface, and a third freeform surface, the first freeform surface refracting a light from a micro-display into a body of the main freeform prism lens, and the main freeform prism lens having an exit pupil diameter greater than 12 millimeter (mm), and a lateral color aberration of less than 4 micrometer (um)) across a diagonal field of view (FOV). The micro-display corrector lens is positioned between the main freeform prism lens and the micro-display, the micro-display corrector lens including a first corrector lens surface and a second corrector lens surface, and each surface of the main freeform prism lens and the micro-display corrector lens comprises surface sag.

Optionally, in the preceding aspect, another implementation of the aspect provides that the surface sag is defined according to $$z = \frac{cr^2}{1 + \sqrt{1-(1+k)c^2r^2}} + \sum_{i=1}^{N} A_i E_i(x, y)$$

with z being the surface sag, c being a curvature of the each surface of the main freeform prism lens and the micro-display corrector lens, r being a radial coordinate at the surface sag, k being a conic constant, N being a number of polynomial terms, A being a coefficient on the ith term in the polynomial, and E being a polynomial power series at points x and y on each surface of the main freeform prism lens and the micro-display corrector lens. Optionally, in any of the preceding aspects, another implementation of the aspect provides that the micro-display corrector lens is configured to perform a chromatic aberration correction on the light from the micro-display. Optionally, in any of the preceding aspects, another implementation of the aspect provides that the second freeform surface is configured to receive the light from the micro-display and totally internally reflect the light received at the second freeform surface. Optionally, in any of the preceding aspects, another implementation of the aspect provides that the third freeform surface is configured to receive the internally reflected light from the second freeform surface and reflect the light out of the main freeform prism lens. Optionally, in any of the preceding aspects, another implementation of the aspect provides that the diagonal FOV is at least 40 degrees. Optionally, in any of the preceding aspects, another implementation of the aspect provides that the main freeform prism comprises a material with a low dispersion. Optionally, in any of the preceding aspects, another implementation of the aspect provides that the micro-display corrector lens comprises a material with a high dispersion. Optionally, in any of the preceding aspects, another implementation of the aspect provides that the micro-display corrector lens comprises a first corrector lens surface that is optically bonded to the first freeform surface and a second corrector lens surface that is directionally opposite the first corrector lens surface. Optionally, in any of the preceding aspects, another implementation of the aspect provides that the first and the second corrector lens surfaces cooperatively perform an aberration correction on the light from the micro-display. Optionally, in any of the preceding aspects, another implementation of the aspect provides that the main freeform prism lens comprises an air gap between the micro-display corrector lens and the first freeform surface. Optionally, in any of the preceding aspects, another implementation of the aspect provides that the main freeform prism lens has a modulation transfer function of at least 10 percent at a Nyquist frequency for an 8 um pixel size of the micro-display. Optionally, in any of the preceding aspects, another implementation of the aspect provides an auxiliary lens coupled to the third freeform surface, the auxiliary lens being configured to minimize a shift and distortion of rays from a real-world image by the second freeform surface and the third freeform surface.

In an embodiment, a near eye display includes a main freeform prism lens and an auxiliary lens. The main freeform prism lens comprises a first freeform surface with a diffractive optical structure and a diffractive relief structure, a second freeform surface, and a third freeform surface. The main freeform prism lens includes an exit pupil diameter greater than 12 millimeter (mm) and a lateral color aberration of less than 4 micrometer (μm) across a diagonal field of view (FOV). The auxiliary lens is coupled to the third freeform surface, the auxiliary lens being configured to minimize a shift and distortion of rays from a real-world image passing through the second freeform surface and the third freeform surface, and each surface of the main freeform prism lens and the auxiliary lens comprises surface sag.

Optionally, in the preceding aspect, another implementation of the aspect provides that the surface sag is defined according to $$z = \frac{cr^2}{1 + \sqrt{1-(1+k)c^2r^2}} + \sum_{i=1}^{N} A_i E_i(x, y),$$

with z being a surface sag, c being a curvature of the each surface of the main freeform prism lens and the micro-display corrector lens, r being a radial coordinate at the surface sag, k being a conic constant, N being a number of polynomial terms, A is a coefficient on the ith term in the polynomial, and E being a polynomial power series in x and y on each surface. Optionally, in any of the preceding aspects, another implementation of the aspect provides that the first freeform surface is configured to diffract light from the micro-display into a body of the main freeform prism lens. Optionally, in any of the preceding aspects, another implementation of the aspect provides that the second freeform surface is configured to receive the light from the micro-display and totally internally reflect the received light at the second freeform surface. Optionally, in any of the preceding aspects, another implementation of the aspect provides that the third freeform surface is configured to receive the internally light reflected from the second freeform surface and reflect the light out of the main freeform prism lens. Optionally, in any of the preceding aspects, another implementation of the aspect provides that the diagonal FOV is at least greater than 40 degrees. Optionally, in any of the preceding aspects, another implementation of the aspect provides that the main freeform prism lens comprises a material with a low dispersion. Optionally, in any of the preceding aspects, another implementation of the aspect provides that the main freeform prism lens has a modulation transfer function of at least 10 percent at a Nyquist frequency for an 8 µm pixel size of the micro-display. Optionally, in any of the preceding aspects, another implementation of the aspect provides that the diffractive optical structure is configured to perform a chromatic aberration correction on light from the micro-display.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Optical see-through near eye displays (NED's) are used for creating virtual, augmented, or mixed-reality experiences. These see-through NED's may superimpose a virtual image, which is received along a micro-display path, with a real-world scene or image that is received along a see-through path, described below. NED's may use few optical elements in order to provide a compact, light-weight, and nonintrusive form factor and also to provide a balance of performance characteristics. Conventional near eye displays use freeform prism lenses as an optical solution due to their compact size, easy manufacturability, and a good balance of performance characteristics, which include field of view (FOV), modulation transfer function (MTF), and eye relief. However, conventional freeform prism lenses in near eye displays perform poorly with respect to other parameters such as chromatic aberration and eye box/pupil diameter. Chromatic aberration can result in colored halos around objects and MTF errors that are visible at the user's eye. Correcting these by adding additional lenses to the near eye display can impact MTF and eye box size.

The optical element in a NED includes a prism lens assembly comprising a main freeform prism lens that is optically bonded to an auxiliary freeform lens. A micro-display is positioned above the lens assembly to transmit a micro-display image into the prism lens assembly. The prism lens assembly projects the micro-display image from the micro-display while also magnifying it. In an example, the micro-display image that is transmitted as light through the prism lens assembly is magnified and placed at a distance of approximately 2 to 2.5 meters away from the user's eye. The magnified micro-display image is overlaid with ambient light from the real-world (e.g., a real-world image) around the user that is transmitted through the prism lens assembly. The auxiliary lens may be optically bonded to the main freeform prism lens at an interface. This interface between the auxiliary lens and the freeform lens includes a partial silver-coating that reflects some of the light from the micro-display and transmits some of the light from the real-world that is superimposed at the exit pupil. The exit pupil is a virtual location where a user can see the entire virtual image if his/her eye is co-located. The main freeform prism and the auxiliary freeform lenses are made from the same material, typically, from a Polymethyl methacrylate (PMMA) material. For the display path, color correction of the image through the main freeform prism lens is limited with only one optical material. Also, surfaces that are common to the main freeform prism lens and the auxiliary freeform lens have limited power during light transmission of the virtual image through the lens assembly to the exit pupil. This limited power may contribute to increased chromatic aberration, increased distortion and decreased MTF of the virtual image generated by the micro-display.

Disclosed herein is a NED with an optical lens assembly comprising a main freeform prism lens, a micro-display corrector element and an auxiliary lens (or feature corrector). In an embodiment, the micro-display corrector element may comprise one of a micro-display corrector lens or an etched diffractive element that is positioned within a micro-display path (also known as an optical path) between the main freeform prism lens and the micro-display. The micro-display corrector refracts or diffracts the light that is transmitted from the micro-display. The combination of the micro-display corrector element with the main freeform prism lens acts as a doublet that reduces chromatic aberration of the light from the micro-display along the micro-display path. Specifically, the micro-display corrector element and the main freeform lens combine to provide better image quality along the micro-display path, provide a large exit pupil diameter (i.e. >12 millimeter (mm)) and low lateral color aberration (i.e. <4 micrometer (μm)) across a diagonal field of view (FOV) of the NED. The at least two optical solutions for the micro-display corrector element in the lens assembly are detailed below, namely a micro-display corrector lens coupled to the main freeform prism lens and a micro-display structure that is etched into an external surface along a micro-display path of the main freeform prism lens are detailed below.

Figure 1:
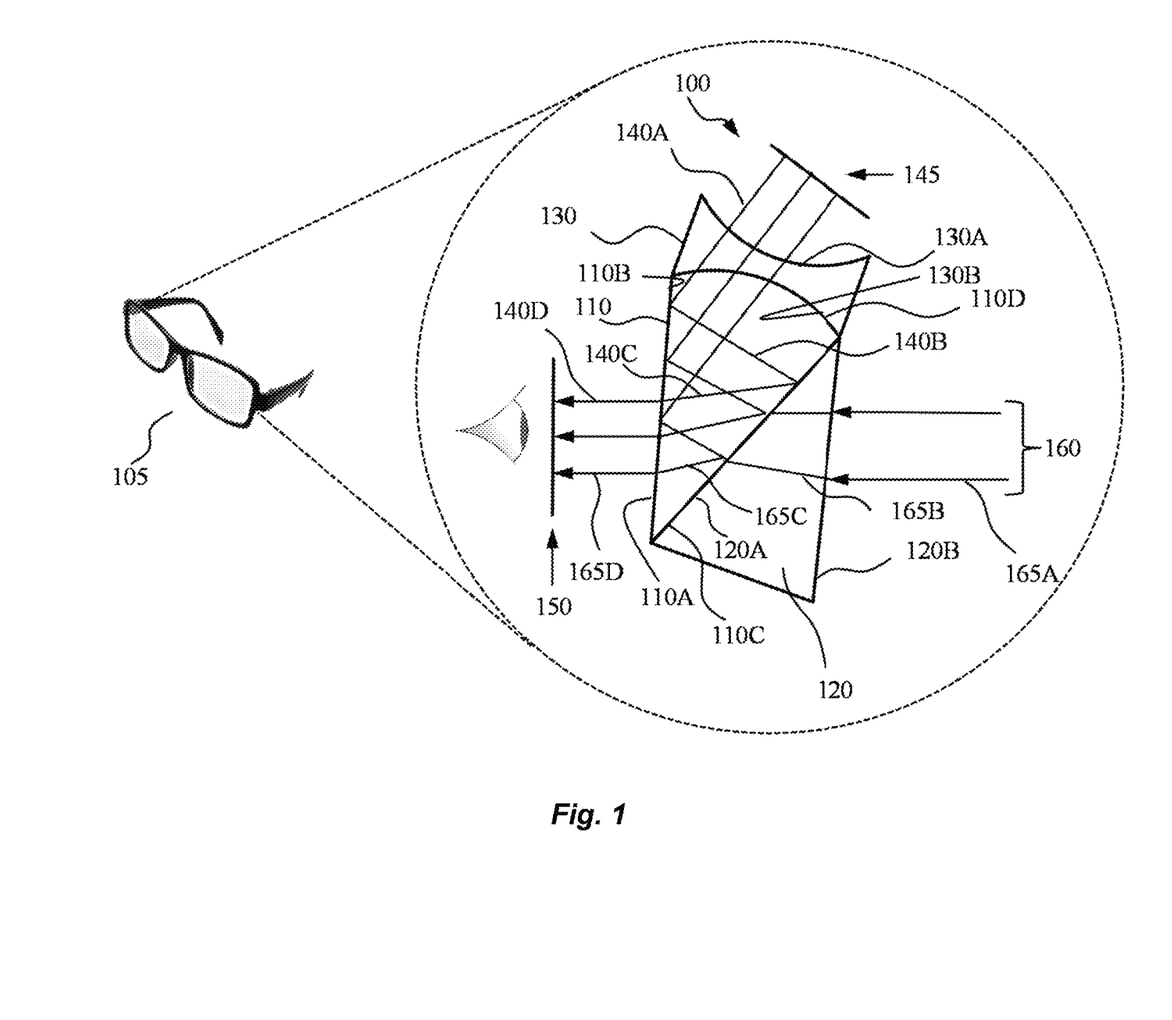
FIG. 1 depicts a schematic illustration of an optical lens system for a near eye display according to an embodiment.
Figure 2:
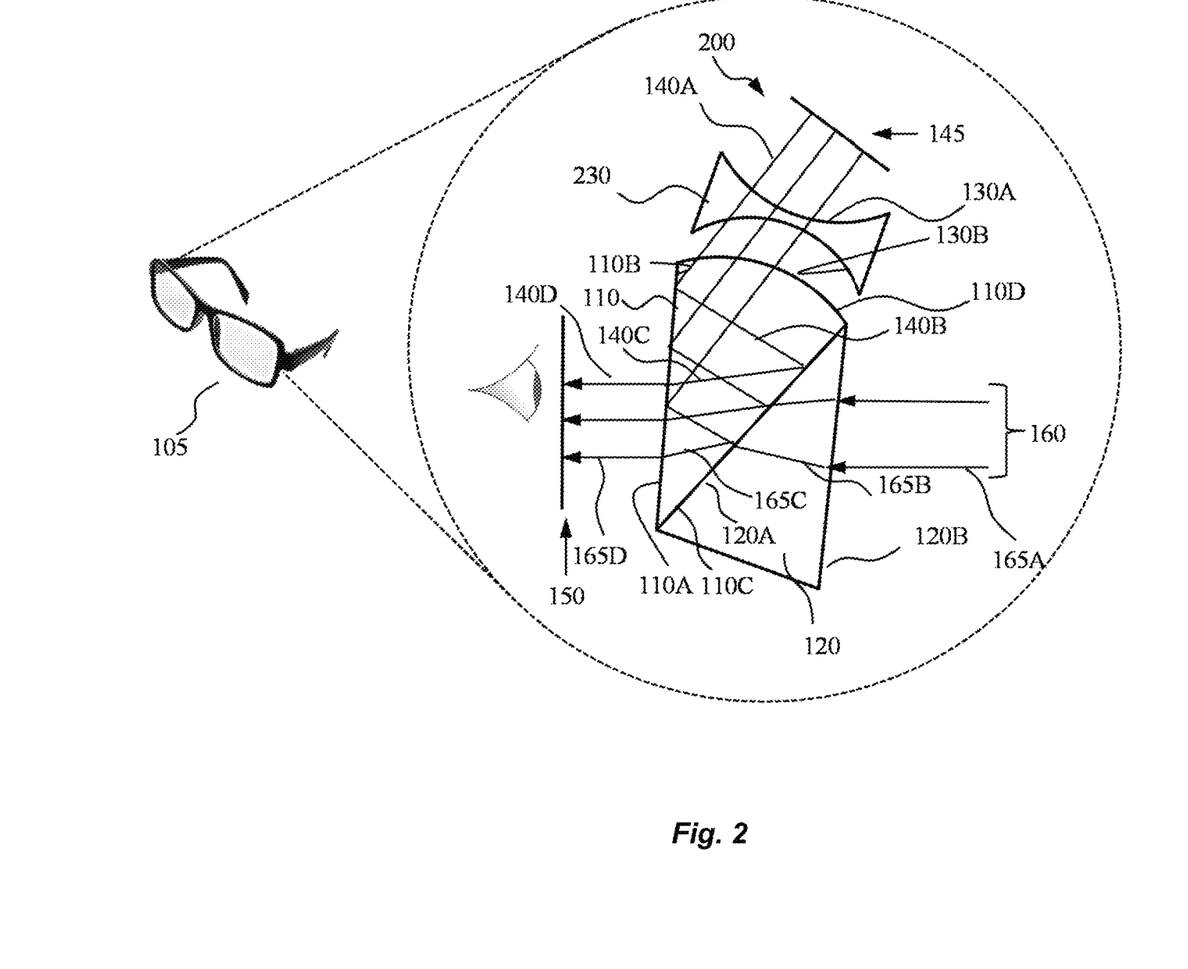
FIG. 2 depicts a schematic illustration of an optical lens system for a near eye display according to an embodiment.
Figure 3:
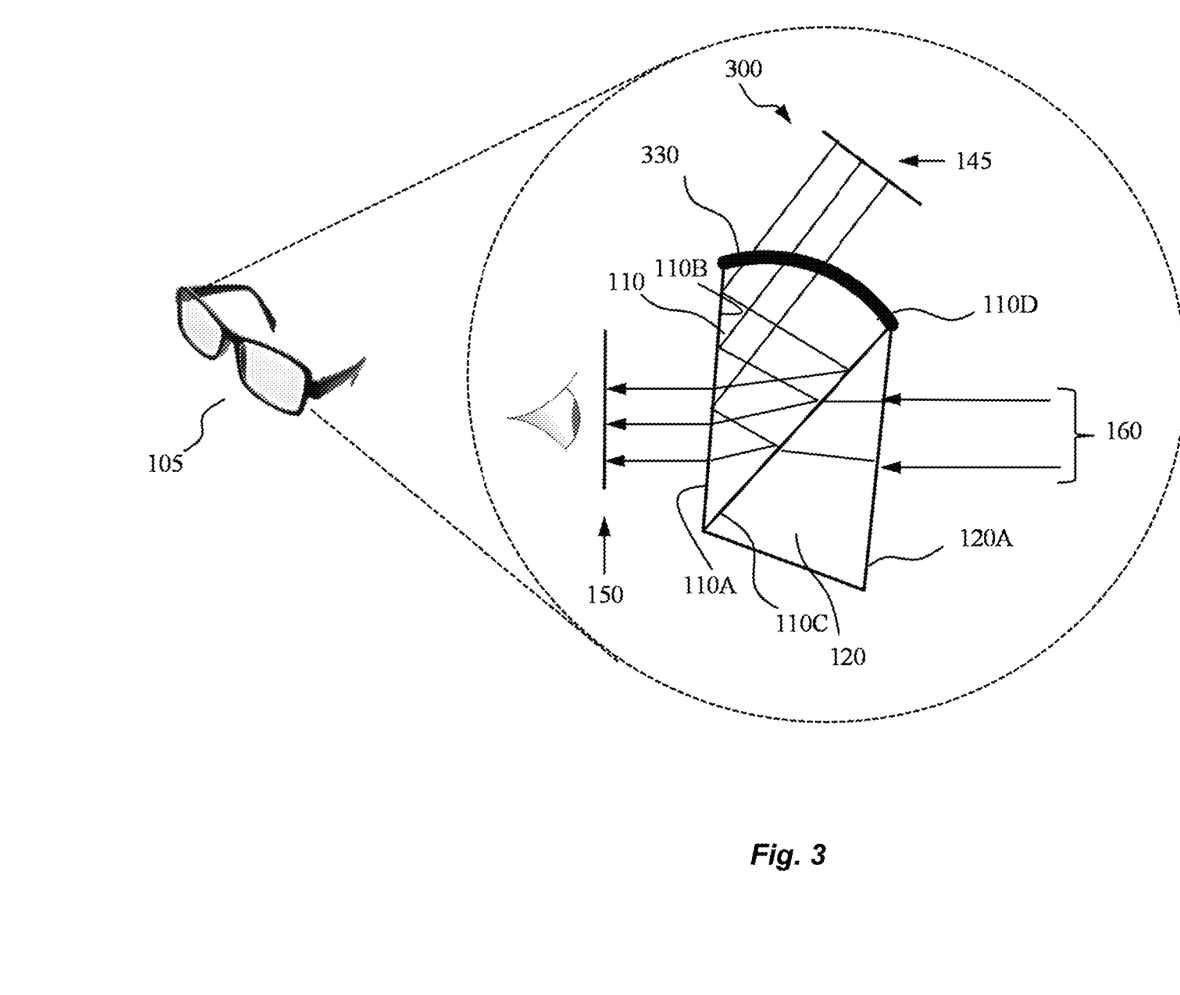
FIG. 3 depicts a schematic illustration of an optical lens system for a near eye display according to an embodiment.

Referring now to the figures, FIGS. 1-3 depict an optical system 100 for a NED 105 that provides an augmented or a mixed-reality experience to a user while improving on performance characteristics over conventional optical systems in accordance with an embodiment of the disclosure. In particular, NED 105 comprises a lens assembly that is configured to combine virtual and real-world images at an exit pupil 150 while also providing performance improvements in lateral color aberration, MTF, and exit pupil diameter across a diagonal FOV, in accordance with an embodiment of the disclosure. In embodiments, NED 105 may comprise either a micro-display corrector lens or an etched diffractive optical element/structure as an additional lens element in a micro-display path to correct color aberrations found in conventional freeform NED's, as will be shown and described below in FIGS. 1-3. The micro-display path is labeled 140A, 140B, 140C, and 140D (collectively micro-display path "140") in FIGS. 1 and 2.

In an embodiment, as shown in FIGS. 1 and 2, NED 105 includes an optical system 100 comprising a main freeform prism lens 110, an auxiliary lens 120, a micro-display corrector lens 130, and a micro-display 145. The main freeform prism lens 110 is a generally wedge-shaped refractive freeform prism lens. Main freeform prism lens 110 comprises surfaces 110A and 110B that are adjacent to exit pupil 150, and an external surface adjacent the micro-display 145, which is labeled as surface 110D in the refraction path. Surface 110A is in the refraction path of micro-display path 140 and surface 110B is in the reflection path of micro-display path 140. In an embodiment, the main freeform prism lens 110 is a low-dispersion lens that may be made from a PMMA material having a refractive index of nd=1.492 and Abbe number of vd=57.44. Main freeform prism lens 110 serves as the near eye viewing optics that magnifies the light image that is transmitted from micro-display 145. In some examples, micro-display 145 is an organic light emitting diode (OLED) panel, a micro LED panel, a liquid crystal on silicon (LCoS) panel, or a digital light processing (DLP) panel.

Optical system 100 comprises an auxiliary lens 120 that is bonded to main freeform prism lens 110. In examples, auxiliary lens 120 is an auxiliary element that may be attached to main freeform prism lens 110. Auxiliary lens 120 may be bonded or cemented to main freeform prism lens 110 with an optically transparent epoxy, may be air-spaced from main freeform prism lens 110, or may be mechanically held against main freeform prism lens 110. In an embodiment, auxiliary lens 120 is a low-dispersion freeform lens that may be made from a PMMA material having a refractive index of nd=1.492 and Abbe number of vd=57.44. Front surface 120A of auxiliary lens 120 may match the shape of rear surface 110C of the main freeform prism lens 110. For instance, protrusions, recesses, and curves on surface 120A may complement protrusions, recesses, and curves on surface 110C when surfaces 120A and 110C are coupled to each other. Back surface 120B of auxiliary lens 120 may be optimized to minimize the power introduced to the light rays from a real-world scene, labeled as 160, when auxiliary lens 120 is combined with main freeform prism lens 110. As the light emitted from micro-display 145 enters the main freeform prism lens 110, the light is refracted and magnified by main freeform prism lens 110. Auxiliary lens 120 may function to maintain a non-distorted see-through view of a real-world scene 160 that is received along the see-through path, labeled as 165A, 165B, 165C, and 165D (collectively see-through path "165"). Auxiliary lens 120 may counteract the light ray shifts and distortion that may be caused by main freeform prism lens 110 as the ambient light from the real-world scene 160 is transmitted through auxiliary lens 120 and combined at exit pupil 150.

In an embodiment, as shown in FIG. 1, micro-display corrector lens 130 in the optical system 100 may be a freeform lens that is positioned in micro-display path 140 of optical system 100. Micro-display corrector lens 130 may be made from a polycarbonate material having a refractive index of nd=1.586 and Abbe number of vd=29.91. Micro-display corrector lens 130 may be a high-dispersion freeform prism lens that is configured to provide a refractive surface to the light that is transmitted from micro-display 145 into main freeform prism lens 110. In an embodiment, micro-display corrector lens 130 may be made from a polycarbonate material, which is a dissimilar material of main freeform prism lens 110. In operation, the combination of micro-display corrector and main freeform prism lenses 110, 130 act as a doublet that reduces the chromatic aberration on the light image from micro-display 145 as it traverses along micro-display path 140 from micro-display 145, to micro-display corrector lens 130 and main freeform prism lens 110, and out of surface 110A to exit pupil 150.

In the embodiment shown in FIG. 1, surface 130B of micro-display corrector lens 130 may be cemented to main freeform prism lens 110 at external surface 110D of main freeform prism lens 110. Cementing micro-display corrector lens 130 to main freeform prism lens 110 provides two surfaces (for example, surfaces 110D and 130A) that are unique to micro-display path 140, which provides additional benefits of aberration correction such that better image quality for micro-display path 140 is possible than with traditional lenses. These additional surfaces provide an additional level of color correction, which improves lateral color aberration, MTF, and exit pupil diameter across a diagonal FOV. In examples, in a micro-display 145 with a resolution being 1920×1080, micro-display corrector lens 130 provides a color correction improvement up to 10× over conventional lenses with half a pixel or 4 μm of lateral color across a 40 degree FOV, less than 10% distortion in the micro-display, improvement of above 10% MTF at the Nyquist frequency for a display that has a 8 um pixel size. Table 1 below provides a non-limiting list of improvements:

TABLE 1

Optical System Specifications

| Parameter | Values |
| --- | --- |
| Display Resolution | 1920 × 1080 color pixels |
| Display FOV | 40° |
| Eye box | 12 mm in diameter at 18 mm eye relief |
| Distortion | <9% across FOV |
| Lateral color aberration | 4 μm across FOV |
| Glass thickness | <14 mm |

Each surface of main freeform prism lens 110, auxiliary lens 120, and micro-display corrector lens 130 may be predefined according to a surface sag z. Surface sag is the departure of a surface from a flat plane. For instance, surfaces 110A-110D of main freeform prism lens 110, surfaces 120A-120B of auxiliary lens 120, and surfaces 130A-130B of micro-display corrector lens 130 may comprise a surface sag z that is defined according to equation (1).

$$z = \frac{cr^2}{1 + \sqrt{1 - (1+k)c^2r^2}} + \sum_{i=1}^{N} A_i E_i(x, y). \quad (1)$$

where, z is a surface sag (offset from a plane/flat surface),
c is a curvature of the surface (inverse of radius),
r is a radial coordinate at which sag is computed,
k is a conic constant,
N is a number of polynomial terms,
A is a coefficient on the $i^{th}$ term in the polynomial, and
E is a polynomial power series at a point x and y.

The surface coefficients A of equation (1) are uniquely defined for each surface. In an example, the surface coefficients A of Equation 1 for surface 130A of the micro-display corrector lens 130 may be defined by the coefficients in Table 2.

TABLE 2

| | |
|---|---|
| Radius (mm) | 25.46938 |
| Conic | 0 |
| Maximum term # | 65 |
| Normalization Radius | 1.7842532 |
| Coefficient on X1Y0 | 0 |
| Coefficient on X0Y1 | 0.99101437 |
| Coefficient on X2Y0 | 0.034101879 |
| Coefficient on X1Y1 | 0 |
| Coefficient on X0Y2 | 0.022971917 |
| Coefficient on X3Y0 | 0 |
| Coefficient on X2Y1 | 0.000646367 |
| Coefficient on X1Y2 | 0 |
| Coefficient on X0Y3 | 0.008863169 |
| Coefficient on X4Y0 | −0.000262406 |
| Coefficient on X3Y1 | 0 |
| Coefficient on X2Y2 | −0.000789294 |
| Coefficient on X1Y3 | 0 |
| Coefficient on X0Y4 | −2.85E−05 |
| Coefficient on X5Y0 | 0 |
| Coefficient on X4Y1 | 4.29E−05 |
| Coefficient on X3Y2 | 0 |
| Coefficient on X2Y3 | −1.84E−05 |
| Coefficient on X1Y4 | 0 |
| Coefficient on X0Y5 | 0.000116483 |
| Coefficient on X6Y0 | 2.89E−06 |
| Coefficient on X5Y1 | 0 |
| Coefficient on X4Y2 | 1.16E−06 |
| Coefficient on X3Y3 | 0 |
| Coefficient on X2Y4 | 3.36E−06 |
| Coefficient on X1Y5 | 0 |
| Coefficient on X0Y6 | −8.30E−06 |
| Coefficient on X7Y0 | 0 |
| Coefficient on X6Y1 | −7.35E−07 |
| Coefficient on X5Y2 | 0 |
| Coefficient on X4Y3 | 1.03E−07 |
| Coefficient on X3Y4 | 0 |
| Coefficient on X2Y5 | −8.47E−06 |
| Coefficient on X1Y6 | 0 |
| Coefficient on X0Y7 | −9.32E−06 |
| Coefficient on X8Y0 | −1.36E−07 |
| Coefficient on X7Y1 | 0 |
| Coefficient on X6Y2 | −2.59E−07 |
| Coefficient on X5Y3 | 0 |
| Coefficient on X4Y4 | −1.78E−07 |
| Coefficient on X3Y5 | 0 |
| Coefficient on X2Y6 | 5.89E−07 |

TABLE 2-continued

| | |
|---|---|
| Coefficient on X1Y7 | 0 |
| Coefficient on X0Y8 | −7.87E−07 |
| Coefficient on X9Y0 | 0 |
| Coefficient on X8Y1 | −5.57E−10 |
| Coefficient on X7Y2 | 0 |
| Coefficient on X6Y3 | 1.96E−08 |
| Coefficient on X5Y4 | 0 |
| Coefficient on X4Y5 | 3.80E−08 |
| Coefficient on X3Y6 | 0 |
| Coefficient on X2Y7 | 4.42E−07 |
| Coefficient on X1Y8 | 0 |
| Coefficient on X0Y9 | 7.40E−07 |
| Coefficient on X10Y0 | 1.18E−09 |
| Coefficient on X9Y1 | 0 |
| Coefficient on X8Y2 | 4.82E−09 |
| Coefficient on X7Y3 | 0 |
| Coefficient on X6Y4 | 1.83E−09 |
| Coefficient on X5Y5 | 0 |
| Coefficient on X4Y6 | 9.55E−10 |
| Coefficient on X3Y7 | 0 |
| Coefficient on X2Y8 | −5.36E−08 |
| Coefficient on X1Y9 | 0 |
| Coefficient on X0Y10 | −6.48E−08 |

In an embodiment, the surface coefficients A of Equation 1 for surface 130B of the micro-display corrector lens 130 and surface 110D of the main freeform prism lens 110 may be defined by the coefficients in Table 3.

TABLE 3

| | |
|---|---|
| Radius (mm) | 17.19611 |
| Conic | 0 |
| Normalization Radius | 1.6452056 |
| Coefficient on X1Y0 | 0 |
| Coefficient on X0Y1 | 1.0607352 |
| Coefficient on X2Y0 | 0.044206662 |
| Coefficient on X1Y1 | 0 |
| Coefficient on X0Y2 | −0.19700274 |
| Coefficient on X3Y0 | 0 |
| Coefficient on X2Y1 | 0.027311318 |
| Coefficient on X1Y2 | 0 |
| Coefficient on X0Y3 | 0.011554472 |
| Coefficient on X4Y0 | 0.000575947 |
| Coefficient on X3Y1 | 0 |
| Coefficient on X2Y2 | −0.0136905 |
| Coefficient on X1Y3 | 0 |
| Coefficient on X0Y4 | −0.003060114 |
| Coefficient on X5Y0 | 0 |
| Coefficient on X4Y1 | −0.000427915 |
| Coefficient on X3Y2 | 0 |
| Coefficient on X2Y3 | 0.001838838 |
| Coefficient on X1Y4 | 0 |
| Coefficient on X0Y5 | 0.000280805 |
| Coefficient on X6Y0 | −2.05E−06 |
| Coefficient on X5Y1 | 0 |
| Coefficient on X4Y2 | 0.000163671 |
| Coefficient on X3Y3 | 0 |
| Coefficient on X2Y4 | −1.30E−05 |
| Coefficient on X1Y5 | 0 |
| Coefficient on X0Y6 | 2.67E−05 |
| Coefficient on X7Y0 | 0 |
| Coefficient on X6Y1 | 2.12E−06 |
| Coefficient on X5Y2 | 0 |
| Coefficient on X4Y3 | −3.61E−06 |
| Coefficient on X3Y4 | 0 |
| Coefficient on X2Y5 | 5.27E−06 |
| Coefficient on X1Y6 | 0 |
| Coefficient on X0Y7 | 1.29E−06 |
| Coefficient on X8Y0 | −6.13E−08 |
| Coefficient on X7Y1 | 0 |
| Coefficient on X6Y2 | −1.37E−07 |
| Coefficient on X5Y3 | 0 |
| Coefficient on X4Y4 | −1.25E−06 |
| Coefficient on X3Y5 | 0 |
| Coefficient on X2Y6 | −7.78E−07 |
| Coefficient on X1Y7 | 0 |
| Coefficient on X0Y8 | 7.10E−08 |

TABLE 3-continued

| | |
|---|---|
| Coefficient on X9Y0 | 0 |
| Coefficient on X8Y1 | 3.35E-08 |
| Coefficient on X7Y2 | 0 |
| Coefficient on X6Y3 | 3.16E-08 |
| Coefficient on X5Y4 | 0 |
| Coefficient on X4Y5 | -3.07E-07 |
| Coefficient on X3Y6 | 0 |
| Coefficient on X2Y7 | -4.65E-07 |
| Coefficient on X1Y8 | 0 |
| Coefficient on X0Y9 | -1.95E-07 |
| Coefficient on X10Y0 | -4.05E-09 |
| Coefficient on X9Y1 | 0 |
| Coefficient on X8Y2 | -2.25E-08 |
| Coefficient on X7Y3 | 0 |
| Coefficient on X6Y4 | 1.60E-09 |
| Coefficient on X5Y5 | 0 |
| Coefficient on X4Y6 | 5.41E-08 |
| Coefficient on X3Y7 | 0 |
| Coefficient on X2Y8 | 5.40E-08 |
| Coefficient on X1Y9 | 0 |
| Coefficient on X0Y10 | 1.67E-08 |

In an embodiment, the surface coefficients A of Equation 1 for surface 110A of main freeform prism lens 110 may be defined by the coefficients in Table 4.

TABLE 4

| | |
|---|---|
| Radius (mm) | 104.1472 |
| Conic | 0 |
| Maximum term # | 65 |
| Normalization Radius | 1.7113138 |
| Coefficient on X1Y0 | 0 |
| Coefficient on X0Y1 | -0.67763474 |
| Coefficient on X2Y0 | -0.023024552 |
| Coefficient on X1Y1 | 0 |
| Coefficient on X0Y2 | 0.05010183 |
| Coefficient on X3Y0 | 0 |
| Coefficient on X2Y1 | -0.004373781 |
| Coefficient on X1Y2 | 0 |
| Coefficient on X0Y3 | -0.000394165 |
| Coefficient on X4Y0 | 8.91E-05 |
| Coefficient on X3Y1 | 0 |
| Coefficient on X2Y2 | -0.000125831 |
| Coefficient on X1Y3 | 0 |
| Coefficient on X0Y4 | -3.02E-05 |
| Coefficient on X5Y0 | 0 |
| Coefficient on X4Y1 | -1.25E-05 |
| Coefficient on X3Y2 | 0 |
| Coefficient on X2Y3 | 4.73E-06 |
| Coefficient on X1Y4 | 0 |
| Coefficient on X0Y5 | 1.30E-06 |
| Coefficient on X6Y0 | -7.35E-06 |
| Coefficient on X5Y1 | 0 |
| Coefficient on X4Y2 | -1.40E-06 |
| Coefficient on X3Y3 | 0 |
| Coefficient on X2Y4 | -6.74E-08 |
| Coefficient on X1Y5 | 0 |
| Coefficient on X0Y6 | -3.16E-09 |
| Coefficient on X7Y0 | 0 |
| Coefficient on X6Y1 | -6.94E-07 |
| Coefficient on X5Y2 | 0 |
| Coefficient on X4Y3 | 1.14E-08 |
| Coefficient on X3Y4 | 0 |
| Coefficient on X2Y5 | -2.64E-08 |
| Coefficient on X1Y6 | 0 |
| Coefficient on X0Y7 | -1.45E-09 |
| Coefficient on X8Y0 | 7.20E-08 |
| Coefficient on X7Y1 | 0 |
| Coefficient on X6Y2 | -2.16E-09 |
| Coefficient on X5Y3 | 0 |
| Coefficient on X4Y4 | 1.25E-09 |
| Coefficient on X3Y5 | 0 |
| Coefficient on X2Y6 | -1.01E-09 |
| Coefficient on X1Y7 | 0 |
| Coefficient on X0Y8 | -4.47E-12 |
| Coefficient on X9Y0 | 0 |
| Coefficient on X8Y1 | 1.33E-08 |
| Coefficient on X7Y2 | 0 |
| Coefficient on X6Y3 | 9.54E-10 |
| Coefficient on X5Y4 | 0 |
| Coefficient on X4Y5 | -1.81E-10 |
| Coefficient on X3Y6 | 0 |
| Coefficient on X2Y7 | -9.36E-12 |
| Coefficient on X1Y8 | 0 |
| Coefficient on X0Y9 | 9.83E-13 |
| Coefficient on X10Y0 | 2.79E-10 |
| Coefficient on X9Y1 | 0 |
| Coefficient on X8Y2 | 4.83E-10 |
| Coefficient on X7Y3 | 0 |
| Coefficient on X6Y4 | 1.55E-12 |
| Coefficient on X5Y5 | 0 |
| Coefficient on X4Y6 | -7.14E-12 |
| Coefficient on X3Y7 | 0 |
| Coefficient on X2Y8 | 4.36E-14 |
| Coefficient on X1Y9 | 0 |
| Coefficient on X0Y10 | 2.00E-14 |

In an embodiment, the surface coefficients A of Equation 1 for surface 110C of main freeform prism lens 110 and surface 120A of auxiliary lens 120 may be defined by the coefficients in Table 5.

TABLE 5

| | |
|---|---|
| Radius (mm) | 29.29903 |
| Conic | 0 |
| Maximum term # | 65 |
| Normalization Radius | 1.2219325 |
| Coefficient on X1Y0 | 0 |
| Coefficient on X0Y1 | 0.1400752 |
| Coefficient on X2Y0 | -0.013881077 |
| Coefficient on X1Y1 | 0 |
| Coefficient on X0Y2 | -0.017311728 |
| Coefficient on X3Y0 | 0 |
| Coefficient on X2Y1 | 2.41E-05 |
| Coefficient on X1Y2 | 0 |
| Coefficient on X0Y3 | 4.84E-05 |
| Coefficient on X4Y0 | -9.78E-06 |
| Coefficient on X3Y1 | 0 |
| Coefficient on X2Y2 | -2.59E-05 |
| Coefficient on X1Y3 | 0 |
| Coefficient on X0Y4 | -1.85E-05 |
| Coefficient on X5Y0 | 0 |
| Coefficient on X4Y1 | 1.86E-07 |
| Coefficient on X3Y2 | 0 |
| Coefficient on X2Y3 | 3.26E-07 |
| Coefficient on X1Y4 | 0 |
| Coefficient on X0Y5 | -9.95E-09 |
| Coefficient on X6Y0 | -1.16E-08 |
| Coefficient on X5Y1 | 0 |
| Coefficient on X4Y2 | 2.08E-09 |
| Coefficient on X3Y3 | 0 |
| Coefficient on X2Y4 | -3.15E-08 |
| Coefficient on X1Y5 | 0 |
| Coefficient on X0Y6 | 1.72E-08 |
| Coefficient on X7Y0 | 0 |
| Coefficient on X6Y1 | 1.54E-09 |
| Coefficient on X5Y2 | 0 |
| Coefficient on X4Y3 | 3.12E-09 |
| Coefficient on X3Y4 | 0 |
| Coefficient on X2Y5 | 2.13E-09 |
| Coefficient on X1Y6 | 0 |
| Coefficient on X0Y7 | 2.38E-09 |
| Coefficient on X8Y0 | -2.11E-10 |
| Coefficient on X7Y1 | 0 |
| Coefficient on X6Y2 | -9.55E-10 |
| Coefficient on X5Y3 | 0 |
| Coefficient on X4Y4 | -8.93E-11 |
| Coefficient on X3Y5 | 0 |
| Coefficient on X2Y6 | 1.28E-11 |
| Coefficient on X1Y7 | 0 |
| Coefficient on X0Y8 | -2.56E-10 |
| Coefficient on X9Y0 | 0 |
| Coefficient on X8Y1 | -7.98E-12 |
| Coefficient on X7Y2 | 0 |

TABLE 5-continued

| | |
|---|---|
| Coefficient on X6Y3 | −4.21E−11 |
| Coefficient on X5Y4 | 0 |
| Coefficient on X4Y5 | −1.51E−11 |
| Coefficient on X3Y6 | 0 |
| Coefficient on X2Y7 | 2.79E−11 |
| Coefficient on X1Y8 | 0 |
| Coefficient on X0Y9 | −1.76E−11 |
| Coefficient on X10Y0 | 4.38E−13 |
| Coefficient on X9Y1 | 0 |
| Coefficient on X8Y2 | 3.96E−12 |
| Coefficient on X7Y3 | 0 |
| Coefficient on X6Y4 | −5.19E−12 |
| Coefficient on X5Y5 | 0 |
| Coefficient on X4Y6 | −2.79E−12 |
| Coefficient on X3Y7 | 0 |
| Coefficient on X2Y8 | 1.78E−12 |
| Coefficient on X1Y9 | 0 |
| Coefficient on X0Y10 | −1.40E−14 |

In an embodiment, the surface coefficients A of Equation 1 for surface 120B of auxiliary lens 120 may be defined by the coefficients in Table 6.

TABLE 6

| | |
|---|---|
| Radius (mm) | 109.2472 |
| Conic | 0 |
| Maximum term # | 65 |
| Normalization Radius | 1.558564 |
| Coefficient on X1Y0 | 0 |
| Coefficient on X0Y1 | 0.372703 |
| Coefficient on X2Y0 | −0.016829562 |
| Coefficient on X1Y1 | 0 |
| Coefficient on X0Y2 | 0.080887253 |
| Coefficient on X3Y0 | 0 |
| Coefficient on X2Y1 | −0.002853677 |
| Coefficient on X1Y2 | 0 |
| Coefficient on X0Y3 | 0.000286929 |
| Coefficient on X4Y0 | −0.000668426 |
| Coefficient on X3Y1 | 0 |
| Coefficient on X2Y2 | −7.62E−05 |
| Coefficient on X1Y3 | 0 |
| Coefficient on X0Y4 | −4.68E−05 |
| Coefficient on X5Y0 | 0 |
| Coefficient on X4Y1 | −6.73E−05 |
| Coefficient on X3Y2 | 0 |
| Coefficient on X2Y3 | 3.21E−06 |
| Coefficient on X1Y4 | 0 |
| Coefficient on X0Y5 | 7.87E−07 |
| Coefficient on X6Y0 | 5.34E−06 |
| Coefficient on X5Y1 | 0 |
| Coefficient on X4Y2 | −8.92E−07 |
| Coefficient on X3Y3 | 0 |
| Coefficient on X2Y4 | −9.17E−08 |
| Coefficient on X1Y5 | 0 |
| Coefficient on X0Y6 | 2.13E−08 |
| Coefficient on X7Y0 | 0 |
| Coefficient on X6Y1 | 2.94E−07 |
| Coefficient on X5Y2 | 0 |
| Coefficient on X4Y3 | 6.35E−08 |
| Coefficient on X3Y4 | 0 |
| Coefficient on X2Y5 | −2.38E−08 |
| Coefficient on X1Y6 | 0 |
| Coefficient on X0Y7 | −1.63E−09 |
| Coefficient on X8Y0 | −1.67E−08 |
| Coefficient on X7Y1 | 0 |
| Coefficient on X6Y2 | −1.57E−08 |
| Coefficient on X5Y3 | 0 |
| Coefficient on X4Y4 | −1.20E−09 |
| Coefficient on X3Y5 | 0 |
| Coefficient on X2Y6 | −9.41E−10 |
| Coefficient on X1Y7 | 0 |
| Coefficient on X0Y8 | −9.63E−12 |
| Coefficient on X9Y0 | 0 |
| Coefficient on X8Y1 | −6.91E−10 |
| Coefficient on X7Y2 | 0 |
| Coefficient on X6Y3 | −1.43E−09 |
| Coefficient on X5Y4 | 0 |

TABLE 6-continued

| | |
|---|---|
| Coefficient on X4Y5 | −1.75E−10 |
| Coefficient on X3Y6 | 0 |
| Coefficient on X2Y7 | −1.33E−11 |
| Coefficient on X1Y8 | 0 |
| Coefficient on X0Y9 | 1.62E−12 |
| Coefficient on X10Y0 | 2.35E−11 |
| Coefficient on X9Y1 | 0 |
| Coefficient on X8Y2 | −5.51E−12 |
| Coefficient on X7Y3 | 0 |
| Coefficient on X6Y4 | −2.71E−11 |
| Coefficient on X5Y5 | 0 |
| Coefficient on X4Y6 | −2.90E−12 |
| Coefficient on X3Y7 | 0 |
| Coefficient on X2Y8 | −4.77E−14 |
| Coefficient on X1Y9 | 0 |
| Coefficient on X0Y10 | 2.53E−14 |

In an embodiment, adhesive glue may be used to cement main freeform prism lens 110 to auxiliary lens 120 and micro-display corrector lens 130. The adhesive glue may comprise an adhesive glue viscosity in a range between 200 millipascal-seconds (mPa·S) to 3000 mPa·S. The adhesive glue may be selected from an acrylic epoxy resin with a monomer compound as a backbone resin. The adhesive glue is optically transparent and may be dispensed onto each bonding surface of main freeform prism lens 110 and auxiliary lens 120 using a micro-needle syringe. Dispensing the adhesive glue may be controlled by a pneumatic operation. The adhesive glue may be cured by a curing process, for example, may be cured by activating the adhesive glue with an ultraviolet A (UVA) light having a wavelength in the range of 365 nanometer (nm) to 405 nm, and having an intensity in the range of 1000 milliJoule (mJ)/square-cm (cm$^2$) to 6000 mJ/cm$^2$.

In an embodiment, as shown in FIG. 2, micro-display corrector lens 230 for optical system 200 of NED 105 may be a lens that is air-spaced from the micro-display 145 and air-spaced from main freeform prism lens 110, while all other features of optical system 200 are substantially the same as optical system 100 of FIG. 1. As shown in FIG. 2, micro-display corrector 230 may be positioned between micro-display 145 and main freeform prism lens 110 in micro-display path 140. The positioning provides an air gap between main freeform prism lens 110 and micro-display corrector 230, and between micro-display 145 and micro-display corrector 230. In some examples, the air gap or separation between micro-display corrector 230 to either or both of main freeform prism lens 110 and micro-display 145 may be adjusted to provide more air gap or less air gap. Performance improvements for micro-display corrector lens 230 may be similar to those in Table 1.

In an embodiment, as shown in FIG. 3, micro-display corrector 330 for optical system 300 of a NED 105 may be an etched diffractive optical element (DOE) structure that may be formed on an external surface 110D of main freeform prism lens 110, while all other features of optical system 300 remain substantially the same as optical system 100 of FIG. 1. In an embodiment, the DOE structure may be etched into surface 110D of main freeform prism lens 110 and provides similar improvements in optical imaging performance as those in FIGS. 1 and 2 including improvements in chromatic aberration, distortion and MTF correction as shown in Table 1. The process of etching a DOE pattern and its depth on the external surface 110D could be performed in a variety of ways such as, for example, by Reactive Ion Etching or Chemical Dry Etching that directly etch a high-quality surface-relief pattern by Reactive gases such as Sulfur hexafluoride (SF6), Tetrafluoromethane (CF4), Freon 114 (CCl2F4) and so forth.

In operation and with reference to FIGS. 1-3, micro-display path 140 may comprise a path traversed by light that is transmitted from micro-display 145 and that is received at exit pupil 150. For example, a light ray that represents the light image may be emitted from a point on micro-display 145 and is incident on the micro-display corrector such as, for example, micro-display corrector lens 130. As the light ray passes through micro-display corrector lens 130, the light ray is refracted by micro-display corrector lens 130. The refracted light ray passes through surface 110D of main freeform prism lens 110 from micro-display corrector lens 130. After two consecutive reflections by surfaces 110B and 110C, the light ray is transmitted through surface 110A and reaches exit pupil 150 of optical system 100. Rays on first surface 110B of main freeform prism lens 110 satisfy the condition of total internal reflection. Rear surface 110C of main freeform prism lens 110 is coated as a partial mirror in order to facilitate the optical see-through capability. The rays from micro-display 145 will be reflected by rear surface 110C while the rays from a real-world scene 160 will be transmitted through rear surface 110C.

Figure 4:
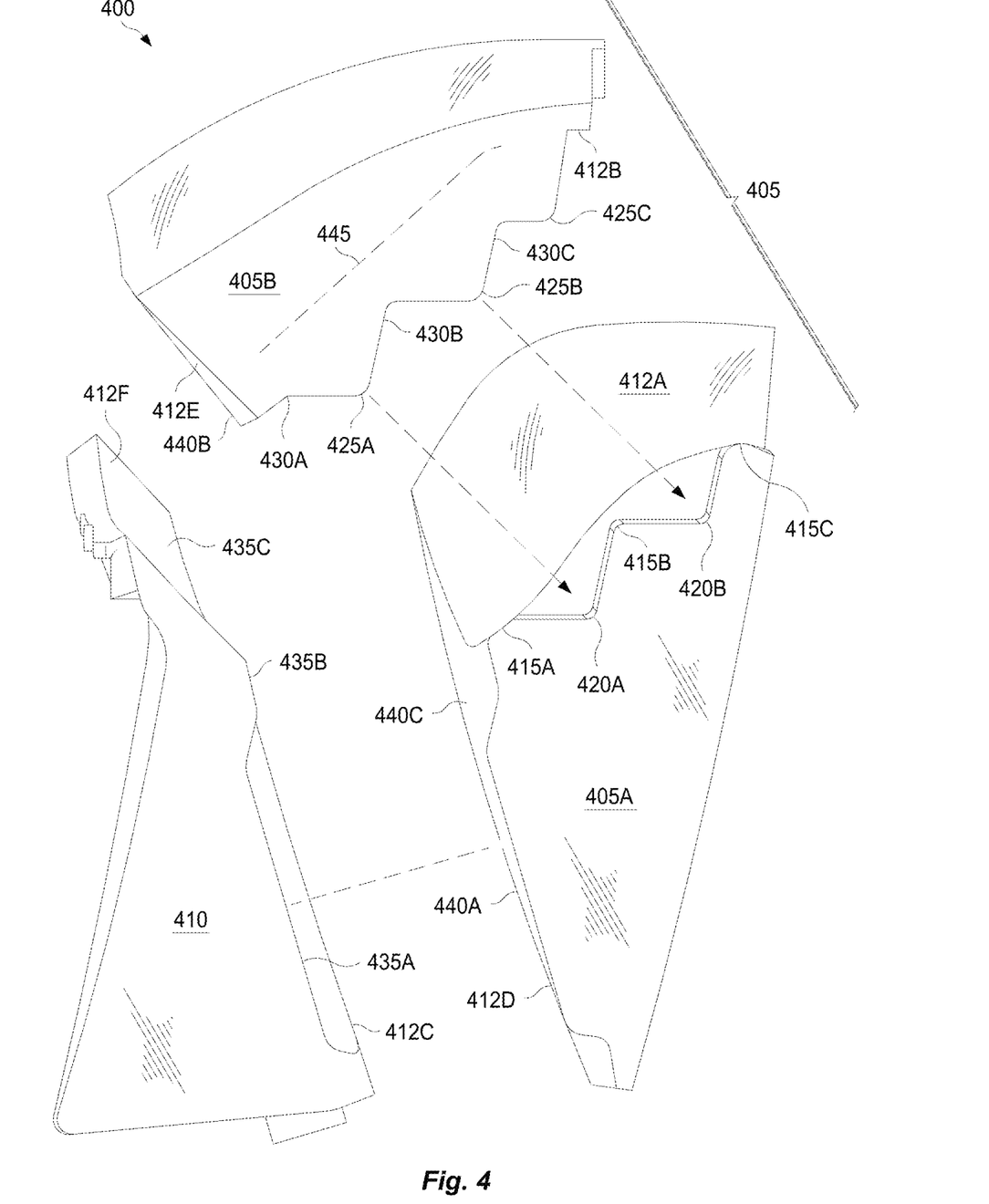
FIG. 4 depicts a lens assembly for a near eye display according to an embodiment.

FIG. 4 depicts an assembly 400 formed by optically cementing freeform prism lenses together using an adhesive glue described above in accordance with an embodiment. In an embodiment, first freeform prism lens 405A (hereinafter "prism lens 405A") may be optically coupled to a second freeform prism lens 405B (hereinafter "prism lens 405B"), and to an auxiliary lens 410. Prism lens 405A and prism lens 405B define a main freeform prism lens 405. In an embodiment, main freeform prism lens 405 may be main freeform prism lens 110 of FIG. 1 and auxiliary lens 410 may be auxiliary lens 120.

In an embodiment, surfaces of prism lens 405A and 405B may be coupled together using interlocking features that are provided at each respective prism lens 405A and 405B. For example, surfaces 412A and 412B may have a complementary surface curvatures, complementary surface sag, and complementary interlocking features (for example, a saw-tooth feature). For instance, prism lens 405A may include interlocking features comprising alternating protrusions 415A, 415B, and 415C, and protrusions 420A, 420B that are arranged in a sawtooth pattern along surface 412A. Also, prism lens 405B may include interlocking features such as protrusions 425A, 425B, 425C, and protrusions 430A, 430B, 430C that are arranged in a sawtooth pattern along surface 412B. Additional protrusions may also be provided on each surface 412A and 412B.

In order to couple prism lenses 405A and 405B together, the protrusions 420A, 420B of the prism lens 405A may be coupled to complementary protrusions 425A and 425B of the prism lens 405B such that prism lenses 405A and 405B form a unitary freeform prism lens 405. Adhesive glue may be used to cement surfaces 412A and 412B together. In another embodiment, fiducial markers may be arranged on prism lenses 405A and 405B to facilitate accurate positioning of prism lens 405A to prism lens 405B prior to coupling prism lenses 405A and 405B to each other. For instance, a fiducial marker 445 on prism lens 405B may be provided to align surface 412B to surface 412A prior to coupling them together. Additional similar fiducial markers on other surfaces including surfaces 412A-412F or on other locations of prism lenses 405A, 405B, and 410 may be provided.

Once assembled, main freeform prism lens 405 may be coupled to auxiliary lens 410. For instance, surfaces 412C, 412D, and 412E may be coupled together in order to couple main freeform prism lens 405 to auxiliary lens 410. Each surface 412C-412E may a complementary surface curvature, surface sage, and protrusions described above. In an embodiment, surface 412C of auxiliary lens 410 may include protrusions such as, for example, protrusion 435B and protrusion 435A, while surfaces 412D and 412E of main freeform prism lens 405 may include complementary protrusions such as, for example protrusions 440A, 440B, and 440C. Protrusion 435A may be coupled to protrusion 440A, protrusion 435B may be coupled to protrusion 440C, and protrusion 440B may be coupled to protrusion 435C. Adhesive glue may be used to fixably couple or cement surface 412C to surface 412D and to cement surface 412F to surface 412E. Similarly, fiducial markers may be positioned on prism lenses 410, 405A, and 405B, including fiducial markets on surfaces 412C-412F, on any other location of prism lenses 405A, 405B, and 410 in order to align prism lenses 405A, 405B, and 410 with each other prior to coupling them together.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein

The invention claimed is:

1. A near eye display, comprising:
a main freeform prism lens, including a first freeform surface, a second freeform surface, and a third freeform surface, the first freeform surface configured to refract a light from a micro-display into a body of the main freeform prism lens, the third freeform surface configured to reflect the light toward an exit pupil, and the main freeform prism lens having an exit pupil diameter of 12 millimeter (mm) at 18 millimeter eye relief; and
a micro-display corrector lens positioned between the main freeform prism lens and the micro-display, the micro-display corrector lens including a first corrector lens surface and a second corrector lens surface, and each surface of the main freeform prism lens and the micro-display corrector lens comprises a surface sag defined according to:

$$z = \frac{cr^2}{1 + \sqrt{1-(1+k)c^2r^2}} + \sum_{i=1}^{N} A_i E_i(x, y).$$

with z being the surface sag, c being a curvature of the each surface of the main freeform prism lens and the micro-display corrector lens, r being a radial coordinate at the surface sag, k being a conic constant, N being a number of polynomial terms, A being a coefficient on an ith term in a polynomial and being defined by a pattern of coefficients where each zero coefficient is immediately followed by a non-zero coefficient, and E being a polynomial power series at point x and y on the each surface of the main freeform prism lens and the micro-display corrector lens, wherein the main freeform prism lens and the micro-display corrector lens are configured to collectively provide a lateral color aberration of 4 micrometer (μm) across a diagonal field of view (FOV) of 40 degrees.

2. The near eye display of claim 1, wherein the micro-display corrector lens is configured to perform a chromatic aberration correction on the light from the micro-display.

3. The near eye display of claim 1, wherein the second freeform surface is configured to receive the light from the micro-display and totally internally reflect the light received at the second freeform surface.

4. The near eye display of claim 1, wherein the third freeform surface is configured to receive internally reflected light from the second freeform surface and reflect the light out of the main freeform prism lens.

5. The near eye display of claim 1, wherein the main freeform prism lens comprises a Polymethyl methacrylate (PMMA) material having a refractive index of nd=1.492 and Abbe number of vd=57.44.

6. The near eye display of claim 1, wherein the micro-display corrector lens comprises a material with a dispersion that is higher than the dispersion of the main freeform prism lens.

7. The near eye display of claim 1, wherein the micro-display corrector lens comprises a first corrector lens surface that is optically bonded to the first freeform surface and a second corrector lens surface that is directionally opposite the first corrector lens surface.

8. The near eye display of claim 7, wherein the first and the second corrector lens surfaces cooperatively perform an aberration correction on the light from the micro-display.

9. The near eye display of claim 1, wherein the main freeform prism lens comprises an air gap between the micro-display corrector lens and the first freeform surface.

10. The near eye display of claim 1, wherein the main freeform prism lens has a modulation transfer function of at least 10 percent at a Nyquist frequency for an 8 um pixel size of the micro-display.

11. The near eye display of claim 1, further comprising an auxiliary lens coupled to the third freeform surface, the auxiliary lens being configured to reduce a shift and distortion of rays from a real-world image by the second freeform surface and the third freeform surface.

12. A near eye display, comprising:
a main freeform prism lens comprising a first freeform surface with a diffractive optical structure and a diffractive relief structure, a second freeform surface, and a third freeform surface, the third freeform surface configured to reflect light toward an exit pupil, the main freeform prism lens having an exit pupil diameter of 12 millimeter (mm) at 18 millimeter eye relief; and an auxiliary lens coupled to the third freeform surface, the auxiliary lens being configured to reduce a shift and distortion of rays from a real-world image passing through the second freeform surface and the third freeform surface, and each surface of the main freeform prism lens and the auxiliary lens comprises a surface sag defined according to:

$$z = \frac{cr^2}{1+\sqrt{1-(1+k)c^2r^2}} + \sum_{i=1}^{N} A_i E_i(x, y).$$

with z being the surface sag, c being a curvature of the each surface of the main freeform prism lens and the auxiliary lens, r being a radial coordinate at the surface sag, k being a conic constant, N being a number of polynomial terms, A being a coefficient on an ith term in a polynomial and being defined by a pattern of coefficients where each zero coefficient is immediately followed by a non-zero coefficient, and E being a polynomial power series in x and y on each surface, wherein the main freeform prism lens and the auxiliary lens are configured to collectively provide a lateral color aberration of less than or equal to 4 micrometer (μm) across a diagonal field of view (FOV) of 40 degrees.

13. The near eye display of claim 12, wherein the first freeform surface is configured to diffract light from a micro-display into a body of the main freeform prism lens.

14. The near eye display of claim 13, wherein the second freeform surface is configured to receive the light from the micro-display and totally internally reflect the received light at the second freeform surface.

15. The near eye display of claim 14, wherein the third freeform surface is configured to receive internally reflected light from the second freeform surface and reflect the light out of the main freeform prism lens.

16. The near eye display of claim 12, wherein the main freeform prism lens comprises a Polymethyl methacrylate (PMMA) material.

17. The near eye display of claim 12, wherein the main freeform prism lens has a modulation transfer function of at least 10 percent at a Nyquist frequency for an 8 μm pixel size of a micro-display.

18. The near eye display of claim 12, wherein the diffractive optical structure is configured to perform a chromatic aberration correction on the light from a micro-display.

* * * * *